United States Patent [19]

Olson et al.

[11] 4,293,118

[45] Oct. 6, 1981

[54] MULTI-FUNCTION OPERATOR FOR CONTROL VALVE DEVICE

[75] Inventors: Paul E. Olson; Michael D. Lyons, both of Lexington, Ky.

[73] Assignee: American Standard Inc., Lexington, Ky.

[21] Appl. No.: 97,265

[22] Filed: Nov. 26, 1979

[51] Int. Cl.³ .................... F16K 31/524; F15B 13/04; F16H 53/00

[52] U.S. Cl. .................. 251/297; 251/258; 251/263; 251/284; 137/596.1; 74/568 R

[58] Field of Search .............. 251/251, 258, 262, 263, 251/297, 284, 288; 74/55, 568 R

[56] References Cited

U.S. PATENT DOCUMENTS

| | | | |
|---|---|---|---|
| 756,491 | 4/1904 | Gold | 251/297 |
| 1,162,693 | 11/1915 | Henry | 74/568 |
| 2,323,737 | 7/1943 | Tritle | 251/251 |
| 2,796,487 | 6/1957 | Dehn | 251/297 |
| 3,416,843 | 12/1968 | Kobnick | 251/263 |
| 3,699,283 | 10/1972 | Ustin | 74/568 R |

FOREIGN PATENT DOCUMENTS 2536093 9/1976 Fed. Rep. of Germany ...... 251/251

Primary Examiner—A. Michael Chambers
Attorney, Agent, or Firm—G. J. Falce

[57] ABSTRACT

An operting handle assembly for actuating a valve or the like including an adjustable actuating cam member that controls the degree of deflection of the valve to obtain different output pressures for a given handle position, for example, and an adjustable friction brake mechanism that sets the desired tension for handle operation.

5 Claims, 4 Drawing Figures

MULTI-FUNCTION OPERATOR FOR CONTROL VALVE DEVICE

BACKGROUND OF THE INVENTION

The present invention relates to handle operated, fluid pressure control valve devices and particularly to control valve devices having cam members for transmitting the handle movement to the valve assembly.

Known valve devices of the above type employ cam members having various fixed surface contours formed on different sectors of the cam surface to accommodate a variety of valve operating characteristics, a particular one of such cam sectors being selected by disassembling the handle shaft in order to rotate the cam member to a position in which the cam sector having the surface configuration capable of providing the desired function is oriented to act on the valve assembly.

SUMMARY OF THE INVENTION

The object of the present invention is to provide an adjustable cam member, which permits different valve operating characteristics to be obtained without requiring disassembly of the cam member from the shaft.

Another object of the invention is to provide a friction adjustment for varying the force required to move the operating handle throughout its full range of travel.

Other features and advantages of the invention, such as arranging the operating handle to be rotated in either a right-hand or a left-hand mode and within predetermined limits, will become apparent.

In accordance with the foregoing objectives, there is provided a versatile, fluid pressure control valve device having an improved handle operating shaft assembly that includes an adjustable cam member via which the handle position is translated into movement of a valve assembly and accordingly a corresponding delivery pressure. The adjustable cam member comprises a carrier member that is splined to the handle shaft and a pair of cam segments pivotally mounted to the carrier. Each cam segment may be rotated about the pivot by means of an adjusting screw that engages the cam segment and is threadedly positioned in the carrier member. By adjusting the degree of rotation of the respective cam segments, the cam contour may be selected to establish a desired delivery pressure for any given handle position.

A further refinement of the handle shaft assembly is the provision of a handle tension adjustment in which a nonrotatable member that is free to slide axially on the shaft is spring-loaded for frictional engagement with a member that is splined to rotate with the handle shaft. The spring tension is adjusted by and transmitted to the nonrotatable member by a self-locking nut that is threaded on a sleeve that is in turn splined to the shaft between the spring and nonrotatable member. By adjusting the axial dimension between the nut, which engages the spring and the sleeve, which engages the nonrotatable member, the spring tension and thus the degree of friction between the nonrotatable and rotatable members is varied, thereby adjusting the handle tension during movement between is full range of travel.

Not only can the foregoing adjustments be carried out without requiring new or different parts, but also without requiring disassembly of the handle operating shaft assembly, by simply removing the handle from the shaft and then removing the shaft assembly cover for access to the adjustments. In replacing the cover and handle, the handle itself may be mounted to either end of the shaft, so as to accommodate operation in either a right or left-hand mode.

BRIEF DESCRIPTION OF THE DRAWINGS

The aforementioned objects and other attendant advantages of the invention will become more apparent from the following more detailed explanation when taken with the drawings in which.

DESCRIPTION AND OPERATION

Figure 1:
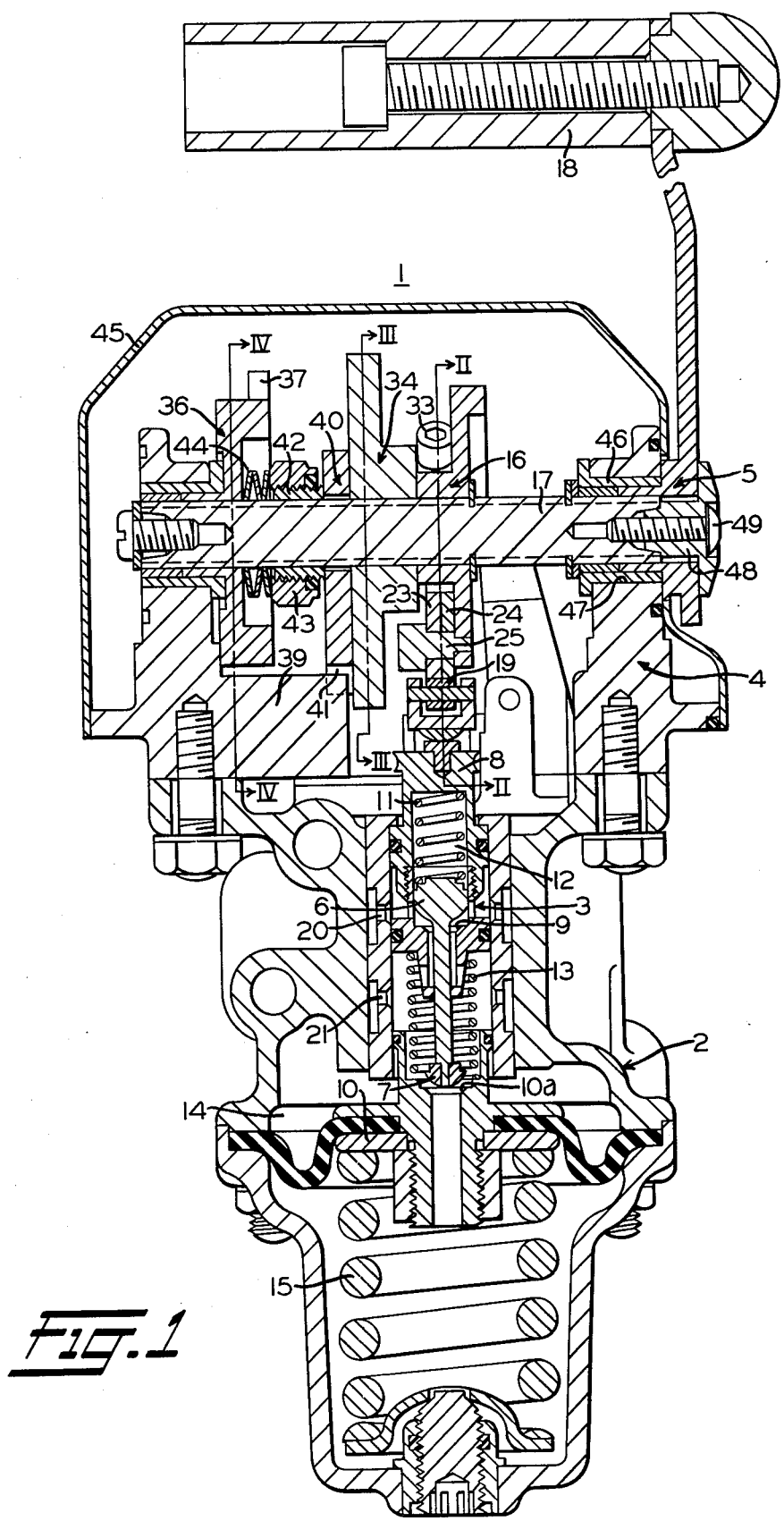
FIG. 1 is an elevational assembly view in section of a fluid pressure control valve device embodying the present invention.

Referring to FIG. 1 of the drawings, the present invention is shown embodied in a fluid pressure control valve device 1 having a lower casing section 2 housing a valve assemblage 3, and an upper casing section 4 housing a handle operating shaft assemblage 5.

Valve assemblage 3 does not constitute an essential feature of the invention, and is shown merely for purposes of illustrating the operation of the control valve device 1 embodying the invention. Valve assemblage 3 is of the self-lapping type (although other valve arrangements are also suitable for use with the present invention) comprising a supply valve 6 and an exhaust valve 7 connected together for operation as a unitary member. A valve actuating member 8 provides an annular seat 9 for supply valve 6, while a diaphragm type balancing piston 10 provides an annular seat 10a for exhaust valve 7. A bias spring 11 is contained in a cavity 12 formed in member 8 and acts on the unitary valve member so as to urge the supply and exhaust valves toward engagement with their respective seats. Another bias spring 13 acts between member 8 and balancing piston 10 so as to urge member 8 in an upward direction for unseating exhaust valve 7. Balancing piston 10 is subject on its upper side to delivery pressure in a feedback chamber 14, and on its under side to the force of a control spring 15.

Figure 2:
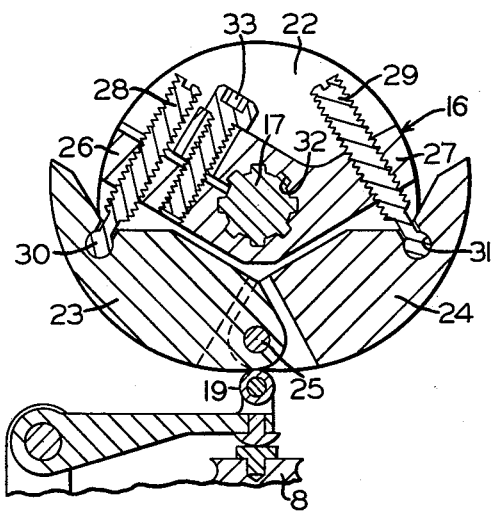
FIG. 2 is a partial sectional view taken along the lines 2—2 in FIG. 1 and showing an adjustable cam member.

The handle operating shaft assemblage 5 includes a disc-shaped cam member 16 that is keyed by splines to a shaft 17 to which a handle 18 is connected for effecting rotation of cam member 16. A cam follower 19, as shown in FIG. 2, as well as FIG. 1, converts the rotary motion of cam member 16 into downward deflection of valve actuating member 8 in either direction of movement of handle 18 from a neutral position. This downward deflection of member 8 disengages supply valve 6 from its seat 9 and allows spring 11 to force exhaust valve 7 into engagement with its seat 10. Supply fluid pressure in a passage 20 is thus conducted past the unseated supply valve to a delivery port (not shown) and to feedback chamber 14 via a passage 21. This delivery pressure in chamber 14 deflects piston 10 and accordingly compresses control spring 15 until supply valve 6 is again seated to terminate further buildup of delivery pressure. Thus, the degree of downward deflection of valve actuating member 8 determines the degree of delivery pressure obtained, depending upon the characteristics of control spring 15.

One aspect of the present invention is that of arranging cam member 16, so as to be adjustable in the sense of varying the contour of its peripheral surface, in order to obtain different degrees of deflection of valve assemblage 3 and accordingly different delivery pressures for a given position of handle 18, without changing cams or in any way disassembling the handle operating shaft assemblage 5.

As shown in FIG. 2, cam member 16 comprises a generally disc-shaped carrier member 22 to which a pair of cam segments 23, 24 having a generally circular-shaped periphery are pivotally connected by a pin 25 that is press fit in carrier member 22, so as to project from the face thereof. These cam segments 23, 24 extend in opposite directions from a plane passing through the axis of pin 25 and the axis of rotation of carrier member 22. A pair of lugs 26, 27 formed on carrier member 22 also extend in opposite directions from the aforementioned plane, and are each provided with a threaded opening having an adjusting screw 28, 29, respectively. A ball-shaped end 30 of these adjusting screws fits in a conforming socket 31 of the respective cam segments, at a point thereof spaced apart from pin 25, so that by adjusting the screws, the cam segments are rotated about pin 25 in either a clockwise or counterclockwise direction. In this manner, it can be seen that the peripheral contour of the cam segments changes with the adjustment of screws 28, 29. As shown, the periphery of cam segments 23 and 24 is essentially circular, but is not limited to such shape, nor are the respective shapes of the cam segments necessarily identical. It will thus be seen that with adjustment of the cam segments, the degree of deflection of valve assemblage 3 and thus the delivery pressure of valve device 1 is caused to vary for a given position of handle 18.

As mentioned previously, cam member 16 is keyed to handle shaft 17 by splines. These splines are formed in an axial bore 32 of carrier member 22 so as to mate with conforming splines on shaft 17. The one lug 26 of carrier member 22 is split radially and is provided with a screw 33 for drawing the split lug together and thereby clamping the carrier member to the shaft when the cam member has been located in the proper axial position along the shaft.

Figure 3:
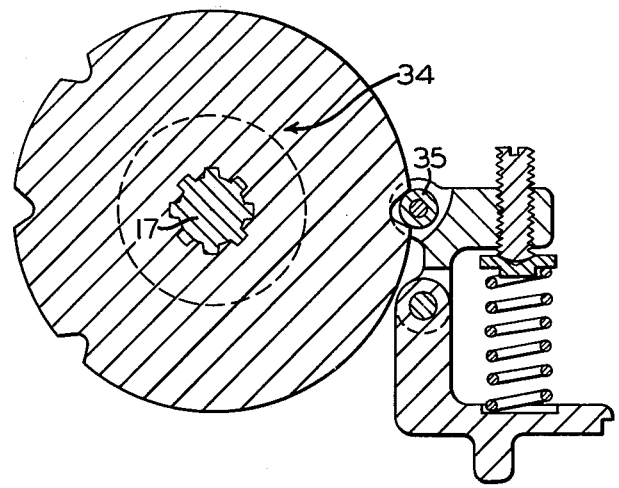
FIG. 3 is a partial sectional view taken along the lines 3—3 in FIG. 1 and showing a detent member.

In FIG. 3, as well as FIG. 1 is shown a detent member 34, which is also keyed to the splined shaft 17, so as to rotate with the handle and accordingly define predetermined handle positions, by reason of a spring loaded detent latch in the form of a roller 35 dropping into one of the notches provided on the periphery of the detent member.

Figure 4:
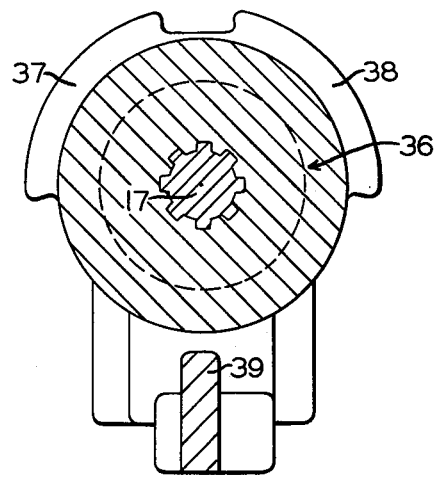
FIG. 4 is a partial sectional view taken along the lines 4—4 in FIG. 1 and showing a handle travel stop member.

In FIG. 4, as well as FIG. 1, is shown a travel stop member 36 that is also keyed to the splined shaft 17 and includes on each side of the vertical centerline a lug 37, 38 that projects from the periphery and is engageable with a stop 39 formed on the casing, in order to limit travel of handle 18 when the handle has been rotated through its maximum range in either direction from neutral or a mid-position.

In another aspect of the invention, the tension on handle 18 may be adjusted in accordance with the operator's individual preferance. There is provided a friction disc member 40 that is carried on shaft 17 with a loose fit so as to be slidable axially thereon, one face of the friction disc member having abutting engagement with the adjacent face of detent member 34. A slot 41 is formed in the periphery of friction disc member 40 to receive a projection of the upper casing section 4 and thereby prevent rotation of brake disc member 40. Also keyed to shaft 17 by splines for abutting engagement with the opposite face of brake disc member 40 is a sleeve 42 having a self-locking adjusting unit 43 threaded on its periphery. The locking nut 43 adjusts the degree of compression of a series of conventional, disc-type springs 44 carried on shaft 17 between nut 43 and the travel stop member 36. These disc springs 44 exert an axial force on brake disc member 40 to produce frictional resistance to rotation of detent member 34 and consequently of handle 18 to which detent member 34 is keyed. Nut 43 may be adjusted with a conventional tool, as for example, an open-end wrench, after a cover 45 of the upper casing section 4 has been removed.

Cover 45 may be removed by first removing handle 18, which is keyed to shaft 17 by splines and which rotates within a bushing 46 that is pressed into a bore 47 formed in the upper casing section. A washer-like plug 48 that is held by a screw 49 to the end of shaft 17, secures the handle 18 in place. The opposite end of shaft 17 is similarly arranged for support in a bushed bore in upper casing section 4, and for receiving handle 18 when it is desired to operate valve device 1 in a left-hand mode instead of a right-hand mode.

It will be apparent, therefore, that various combinations of handle mounting location, handle operating range, detent position, output pressure adjustment and handle tension may be obtained without changing parts.

Having now described the invention, what we claim as new and desire to secure by Letters Patent, is:

1. A control valve device comprising:
  (a) a valve assembly operable to deliver fluid pressure in accordance with the degree of deflection of said valve assembly from a normal position;
  (b) an operating handle assembly;
  (c) a cam member connected to said operating handle assembly for rotation in response to actuation thereof, the outer periphery of said cam member being engageable with said valve assembly and having a contour to effect said deflection of said valve assembly in response to rotation of said cam member; wherein the improvement comprises:
  (d) said cam member having adjusting means for altering the contour of said outer periphery thereof to accordingly vary said deflection of said valve assembly and consequently the output fluid pressure of said valve assembly, said adjusting means comprising:
    (i) a carrier member connected to said handle assembly for rotation therewith;
    (ii) a pin projecting from one face of said carrier member;
    (iii) at least one cam segment pivotally connected to said pin and providing said outer periphery of said cam member; and
    (iv) an adjusting screw threadedly carried by said carrier member and having a ball formed at one end for connection with said at least one cam segment at a socket thereof spaced apart from said pin, whereby said adjusting screw is adapted to effect rotation of said cam segment about said pin to vary the contour of the periphery of said cam member for a given position of said handle assembly.

2. A control valve device as recited in claim 1, wherein said carrier member comprises:
(a) a pair of lugs extending in opposite directions from a plane passing through the axis of said pin and the axis of rotation of said carrier member;
(b) said at least one cam segment being a pair of cam segments pivotally connected to said pin and extending in opposite directions from said plane to provide said outer periphery of said cam member; and
(c) said adjusting screw carried by said carrier member being carried in a threaded opening in each said lug of said carrier member, each adjusting screw having said ball and socket connection with a respective one of said cam segments.

3. A control valve device as recited in claim 1, further characterized in that the periphery of said cam segments is circular in shape.

4. A control valve device as recited in claim 1, further comprising means for adjusting the resistance to movement of said operating handle assembly.

5. A control valve device as recited in claim 4, wherein said operating handle assembly comprises:
(a) a shaft;
(b) a handle connected to said shaft for effecting rotation thereof;
(c) said means for adjusting the resistance to movement of said handle assembly including:
 (i) said cam member;
 (ii) a brake member carried on said shaft for axial movement thereon, said brake member having engagement with the casing of said valve device to prevent rotation on said shaft;
 (iii) spring means for exerting an axial force on said brake member to effect movement thereof into frictional engagement with said cam member; and
 (iv) means for adjusting the degree of tension of said spring means to vary the degree of friction between said cam and brake members due to relative rotation therebetween in response to operation of said handle.

* * * * *